United States Patent [19]

Nagashima et al.

[11] 4,335,919
[45] Jun. 22, 1982

[54] SEAT RECLINING DEVICE

[75] Inventors: Hideyuki Nagashima, Yokohama; Ken Kamijo, Yokosuka, both of Japan

[73] Assignee: Nissan Motor Co., Ltd., Yokohama, Japan

[21] Appl. No.: 124,785

[22] Filed: Feb. 26, 1980

[30] Foreign Application Priority Data

Mar. 6, 1979 [JP] Japan .......................... 54/28845[U]

[51] Int. Cl.³ ............................................ A47C 1/025
[52] U.S. Cl. .................................. 297/362; 248/429; 297/330
[58] Field of Search ................ 297/362, 330; 248/429

[56] References Cited

FOREIGN PATENT DOCUMENTS

| 2446181 | 5/1976 | Fed. Rep. of Germany . |
| 2733484 | 2/1979 | Fed. Rep. of Germany ...... 297/330 |
| 2844360 | 4/1979 | Fed. Rep. of Germany . |
| 2846927 | 5/1979 | Fed. Rep. of Germany ...... 297/330 |
| 2034923 | 6/1980 | United Kingdom ................ 297/362 |

Primary Examiner—William E. Lyddane
Attorney, Agent, or Firm—Silverman, Cass & Singer, Ltd.

[57] ABSTRACT

A seat reclining device of a vehicle is provided with a position memory function. The device includes a position memory wheel having an integrally formed reset cam and a reset lever engaging therewith. The reset lever is urged onto the periphery of the reset cam of the position memory wheel by spring force and normally contacts therewith at least two points.

3 Claims, 3 Drawing Figures

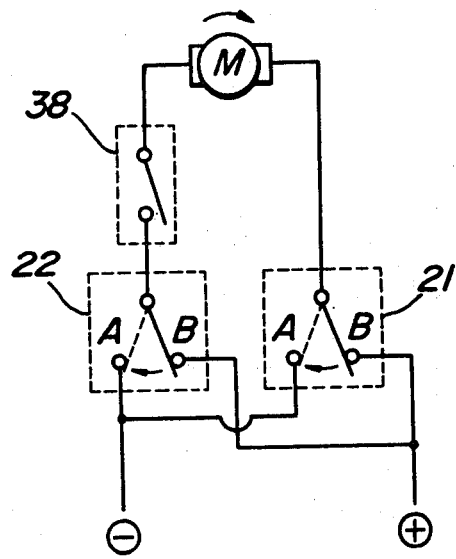

SEAT RECLINING DEVICE

BACKGROUND OF THE INVENTION (1) Field of the Invention

The present invention relates to a reclining device of a vehicle seat, used in for instance automobiles, aeroplanes, ships or the like.

(2) Description of the Prior Art

It is known to use a memory wheel as a memory mechanism for memorizing reclined position of a seat. For rotating such a memory wheel of the known type, it is necessary to urge a reset lever onto a reset cam provided on the memory wheel. However, a comparatively large controlling, operational power is required for urging and rotating the reset lever.

SUMMARY OF THE INVENTION

The present invention improves the reclining device to mitigate the aforementioned disadvantage. The present invention has for its object to realize a reclining device being able to memorize a position with a very light, reset operational power.

BRIEF DESCRIPTION OF THE DRAWINGS

The invention will now be explained by referring to the accompanying drawings, in which:

FIG. 3 is a circuit diagram of the memory circuit for operating the device.

DESCRIPTION OF THE PREFERRED EMBODIMENT

Figure 1:
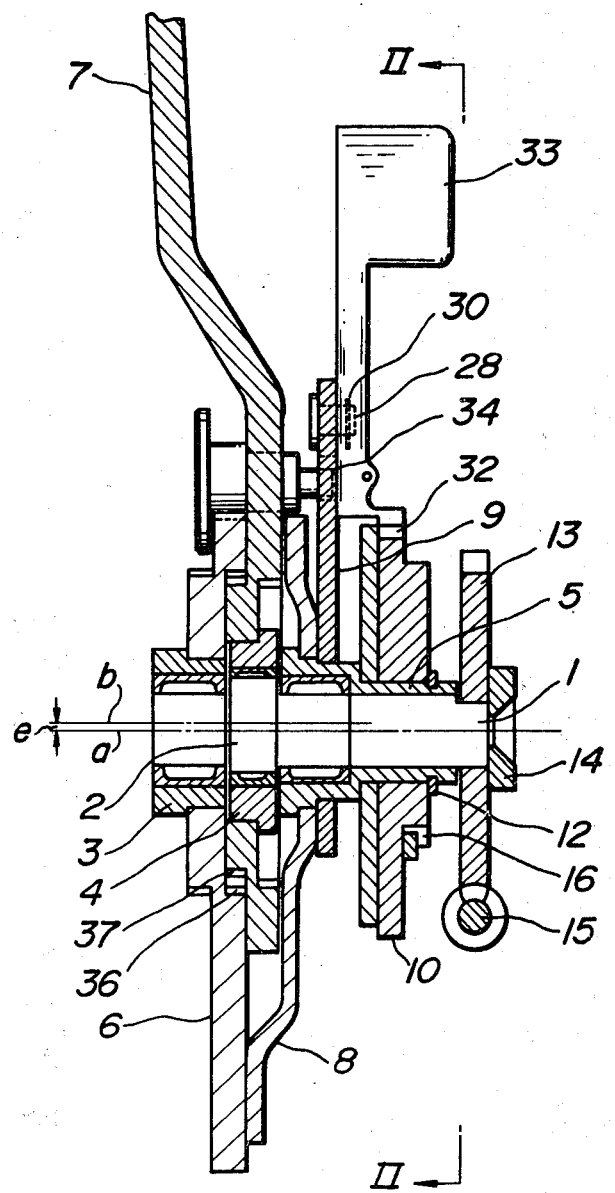
FIG. 1 is a cross-sectional view showing one embodiment of the seat reclining device according to the present invention.

Referring to FIG. 1, the reference numeral 1 designates a shaft which has an eccentric shaft portion 2. The eccentric shaft portion 2 has an axis b shifted by a distance "e" from an axis a of the shaft 1. Onto this shaft 1, a left end bushing 3 having a bearing portion, an eccentric bushing 4, and a right end bushing 5 are mounted in order from the left in a freely rotatable manner.

Onto these bushings 3, 4 and 5, a seat cushion plate 6, a reclining arm 7, a support plate 8, an arm bracket 9, and a memory wheel 10 are mounted in order from the left in a freely rotatable manner.

The aforementioned seat cushion plate 6 is journaled on the shaft 1 via the left end bushing 3 and is secured in position by a shoulder portion formed on the left end bushing 3 so as not to fall from the shaft to the left side. The reclining arm 7 is journaled on the eccentric shaft portion 2 by means of the bushing 4. The support plate 8 and the arm bracket 9 are journaled on the right end bushing 5. The memory wheel 10 is also directly journaled on the bushing 5. A snap ring 12 is mounted on the right end bushing 5 at the right side of the memory wheel 10 so as to maintain the supported elements on the bushings. One peripheral portion of the shaft 1 extending beyond the right end bushing 5 to the right side is cut for mounting a worm wheel 13 which does not rotate around the shaft 1. This worm wheel 13 is fixed in position on shaft 1 by a securing plate 14 fixed by a screw or the like. The worm wheel 13 meshes with a worm 15 which is rotated in either direction by a motor not shown in the drawing. The aforementioned support plate 8 is arranged to contact the reclining arm 7 at the upper portion thereof to prevent bending of the arm 7 and the lower edge is fixed to the seat cushion plate 6.

The memory wheel 10 is formed of a disk having a reset cam 16 formed integrally therewith, a gear portion (meshing portion) 17 disposed at the upper periphery thereof and a small diameter portion 18 disposed at the lower periphery thereof. The memory wheel 10 is journaled to freely rotate about the shaft 1. The small diameter portion 18 has two ends providing smooth curved transitions 19 and 20 to act as a cam. Detecting members 21a and 22a of a forward drive switch 21 and a rearward drive switch 22 are in contact with the small diameter portion 18. These switches deliver signals to drive the worm 15 in either the forward or rearward direction by detecting the direction of inclination in angle of the reclining arm 7. The detecting members 21a and 22a are arranged to produce the signal after adopting the ON condition when they come out of the small diameter portion 18. The aforementioned switches 21 and 22 are mounted on two brackets 23 and 24 respectively. The brackets 23 and 24 are secured on the seat cushion plate 6 and the support plate 8 or either one of them by screws or other suitable means. A reset lever 25 is provided and supported in a freely rotatable manner by a shaft 26 projecting from the support plate 8. At one end of the reset lever 25, a contacting surface 25a is formed and presses against surface of the reset cam 16. In order always to press the contacting surface 25a against the peripheral surface of the reset cam 16, a bias spring 27 is provided between the other end portion 25c of the reset lever 25 and a pin 6a mounted on the seat cushion plate 6. A snap ring 25b is provided on the shaft 26 to maintain the reset lever 25 thereon.

Figure 2:
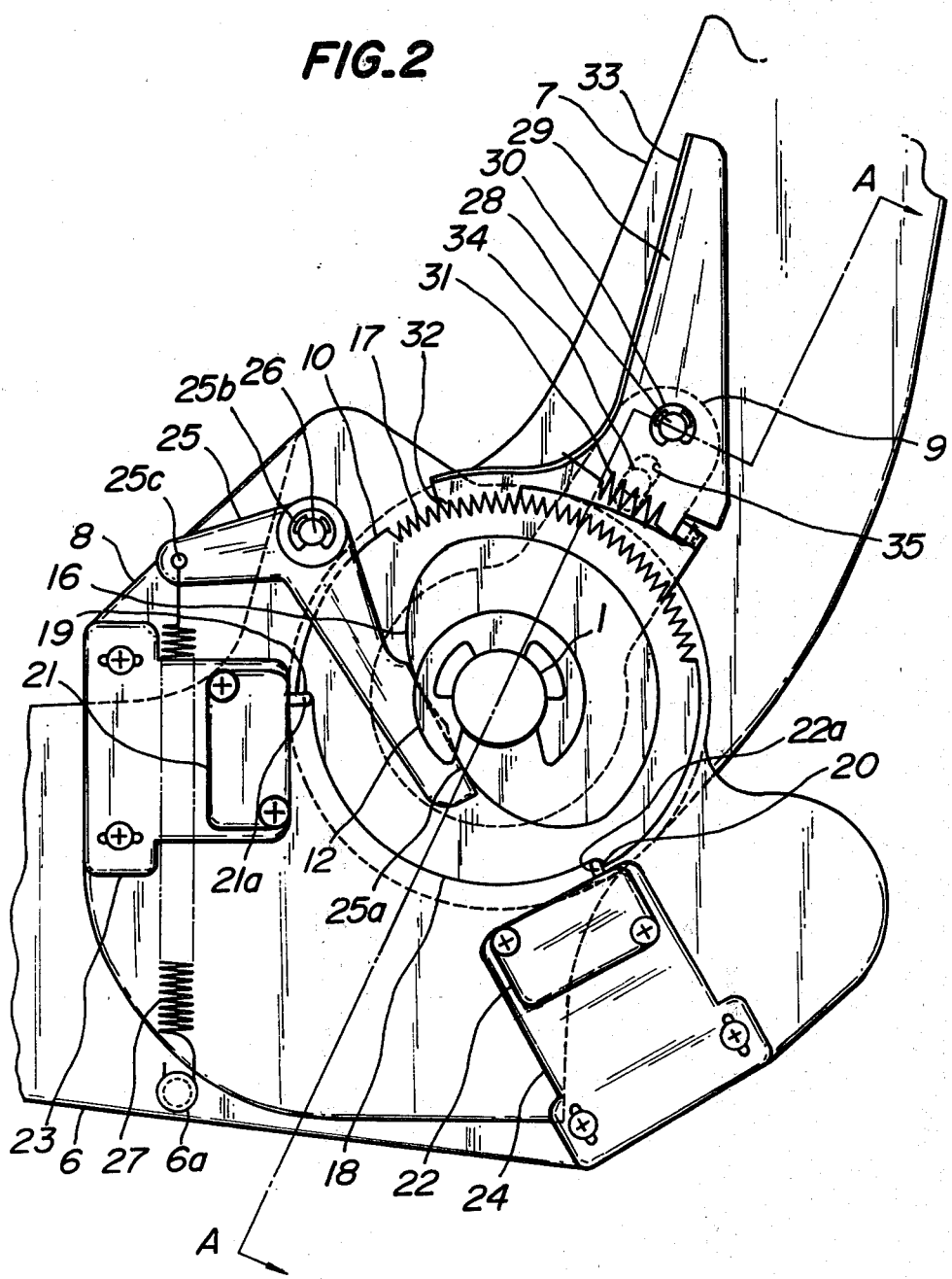
FIG. 2 is a cross-sectional view taken along line II—II of FIG. 1.

In the position of the memory wheel 10 shown in FIG. 2, the detecting elements 21a and 22a of the switches 21 and 22 are in contact with the transition portions 19 and 20 so that both switches 21 and 22 are in the OFF condition. If the forward rotation switch 21 adopts the ON condition, the memory wheel 10 is driven to rotate forwardly or clockwisely in FIG. 2 by the worm 15, the worm wheel 13 and the shaft 1. On the contrary, if the reverse rotation switch 22 adopts the ON condition, the memory wheel 10 is driven to rotate rearwardly or counterclockwisely in FIG. 2.

A supporting shaft 28 is provided on the arm bracket 9 extending towards the gear portion 17 of the memory wheel 10. On this shaft 28, a stopper 29 which is an elongated member is pivotted about its center in a freely rotatable manner. This stopper 29 is mounted on the supporting shaft 28 by means of an E shaped ring 30. The stopper 29 is biassed against the memory wheel 10 by a coil spring 31 having one end engaged at one side edge of the stopper 29 and another end engaged at one side edge of the bracket 9. By this bias force, a pawl 32 of the stopper 29 is meshed with the gear portion 17 of the memory wheel 10. The pawl 32 of the stopper 29 has a gear shaped lower surface which meshes with the gear portion 17. The upper end of the stopper 29 is formed as an operating grip 33. The arm bracket 9 engages with coupling pin 34 provided on the reclining arm 7 by way of its coupling recess 35 so that the arm bracket 9 rotates about the shaft 1 together with the reclining arm 7. The pawl 32 need not be a gear shaped but it may be a single projection engaging with the gear portion 17.

An inner set of gear teeth 36 is provided on the seat cushion plate 6 at a side facing the reclining arm 7 as shown in FIG. 1. An outer set of gear teeth 37 meshing with said inner gear teeth 36 is provided on the reclining arm 7. The outer set of gear teeth 37 has a smaller number of the teeth than said inner gear teeth 36 by at least one (one tooth) and the gear is formed to have a smaller diameter in an amount corresponding to the height of the teeth.

The shaft 1 is pivotted on the seat cushion plate 6 having the set of inner gear teeth 36 so that if the shaft 1 is rotated in the clockwise direction in FIG. 2, the set of inner gear teeth 36 and the set of outer gear teeth 37 successively change the meshing position therebetween by the aforementioned difference e between the position of axis a of the shaft 1 and the axis b of the eccentric shaft portion 2. The reclining arm 7 having the set of outer gear teeth 37 and the set of outer gear teeth 37 rotate in the opposite direction against the direction of rotation of the shaft 1, i.e. rotate counterclockwise in FIG. 2 at a reduced speed. If the shaft 1 is rotated counterclockwise, the reclining arm 7 rotates clockwise as is apparent from the above explanation.

The reclining operation will be explained hereinafter by referring to the memory circuit of FIG. 3. This circuit illustrates a condition in which the memory wheel 10 is in a normal position. In this position both the switches 21 and 22 are in the OFF condition and the contact arms are in contact with the B contacts. Accordingly, no circuit is established by closing the return switch 38 and the motor M is not energized. Then we consider a case when a driver sits on the seat and by controlling buttons in the control circuit not shown in the drawing rotates the shaft 1 so as to recline the reclining arm 7 forwardly or rearwardly. If the reclined position is desired to be memorized, controlling end 33 of the stopper 29 is depressed against the tensile force of the spring 31. By this action, the pawl 32 meshing with gear portion 17 of the memory wheel 10 is disengaged. Since the memory wheel 10 had been rotated together with the reclining arm 7 at the time of rotation of the reclining arm 7, the reset cam 16 rotates about the shaft 1, which is the rotating axis, under the pressing force of the pressing surface 25a of the reset lever 25 being urged against the reset cam 16 by the tensile force of the spring 27. The reset cam 16 rotates until its peripheral surface contacts the pressing surface 25a at two points. At this position both the switches 21 and 22 adopt the OFF condition. By removing the then applied outer force against the operating end portion 33 so as again to mesh the pawl 32 with the gear portion 17 of the memory wheel, the reclined position of the reclining arm 7 is now memorized.

By actuating an operating button of the operating circuit not shown in the drawing to rotate the shaft, to change the reclining angle of the reclining arm 7 as desired, the small diameter portion 18 acts to switch either the forward switch 21 or the rearward switch 22 to change the switching element from the contact B to the contact A.

If it is desired to return the seat to the memorized position of the reclining arm 7, the return switch 38 in the memory circuit shown in FIG. 3 is depressed. In this case, if we assume that the forward switch 21 has been operated in the ON condition, current flows through via the following circuit and the motor M is driven to rotate in forward direction.

Source+→B contact of rearward switch 22 →return switch 38→motor M→A contact of forward switch→earth.

The shaft 1 is rotated clockwisely and the reclining arm 7 is reclined forwardly toward the seat cushion side (counterclockwisely). The motor M continues to rotate until the memory wheel 10 obtains the normal position. When the memory wheel 10 is in the normal position, the switch element of the forward switch 21 is switched from the contact A to the contact B by the small diameter portion 18. By this operation, the current which had been flowing through the motor M is now interrupted. The reclining arm 7 is now returned to a position memorized in the previous operation.

By this embodiment of the present invention, the reclining position can be memorized by a very simple mechanism so that overall cost of the device can be decreased.

A further advantage of this embodiment of the present invention is that the operating lever (stopper 29) which is operated at the time of memorizing the reclined position can be handled very easily by simply depressing its operating end 33 so as to disengage the pawl 32 at the other end thereof from the memory wheel 10.

The seat reclining device as has been explained in the foregoing is very easy for handling and can be manufactured at low cost so that it has wide applicability.

What is claimed is:

1. A seat reclining device for a seat cushion plate having a reclining arm which is reclinable in two opposed directions of inclination, the device comprising;
   a memory wheel pivotaly attached to and freely rotatable on the reclining arm, said memory wheel including an integrally formed reset cam;
   an engagement member coupled to said reclining arm and adapted to be brought into engagement with the memory wheel under application of a bias force so that said memory wheel rotates together with said reclining arm in either direction of inclination, said engagement member including a handle which when operated releases the engagement member from engagement with the memory wheel against the influence of the bias force;
   a reset lever engageable with said reset cam under the force of a spring to rotate said reset cam and thereby said memory wheel to a rotary, memorized position relative to the reclining arm when said handle is operated;
   switch means mounted on said seat cushion plate and contacting said memory wheel for detecting the direction of inclination of the reclining arm from the memorized position indicated by the memory wheel; and
   motor means for driving the reclining arm in a direction opposite the detected direction of inclination to the memorized position in response to said switch means,
   so that any reclined position of the reclining arm may be memorized by operation and release of the handle of the engagement member, the reclining arm thereafter being reclined in either of two opposed directions and returned to the memorized position by said motor means.

2. The device as claimed in claim 1 in which said reset lever contacts said reset cam at at least two points when the reset cam is in said rotary memorized position.

3. The device as claimed in claim 1 in which said switch means include a pair of switches contacting said memory wheel.

* * * * *